US010848210B2

(12) United States Patent
Lee et al.

(10) Patent No.: US 10,848,210 B2
(45) Date of Patent: Nov. 24, 2020

(54) METHOD FOR TRANSMITTING FEEDBACK INFORMATION IN WIRELESS COMMUNICATION SYSTEM AND APPARATUS THEREFOR

(71) Applicant: LG Electronics Inc., Seoul (KR)

(72) Inventors: Sangrim Lee, Seoul (KR); Woonghee Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/615,595

(22) PCT Filed: May 21, 2018

(86) PCT No.: PCT/KR2018/005796
§ 371 (c)(1),
(2) Date: Nov. 21, 2019

(87) PCT Pub. No.: WO2018/216989
PCT Pub. Date: Nov. 29, 2018

(65) Prior Publication Data
US 2020/0106490 A1    Apr. 2, 2020

Related U.S. Application Data

(60) Provisional application No. 62/509,170, filed on May 21, 2017.

(51) Int. Cl.
*H04N 19/176* (2014.01)
*H04B 7/0417* (2017.01)
(Continued)

(52) U.S. Cl.
CPC ........... *H04B 7/0417* (2013.01); *H04B 7/046* (2013.01); *H04B 7/0634* (2013.01); *H04N 19/176* (2014.11)

(58) Field of Classification Search
USPC .................................. 375/260, 267; 370/329
See application file for complete search history.

(56) References Cited

U.S. PATENT DOCUMENTS 8,665,971 B2 *  3/2014  Abrishamkar ...... H04L 25/0242
                                                    375/260
10,498,558 B1 * 12/2019  Pajovic .................. H04B 1/709
(Continued)

FOREIGN PATENT DOCUMENTS

JP        2011172067       9/2011
KR      20090076993       7/2009
(Continued)

OTHER PUBLICATIONS

Lee et al., "Introduction to Compression Sensing," Gwangju Institute of Science and Technology, Journal of the Institute of Electronics Engineers of Korea, dated Jan. 2011, 13 pages. (with English translation).
(Continued)

*Primary Examiner* — Eva Y Puente
(74) *Attorney, Agent, or Firm* — Fish & Richardson P.C.

(57) ABSTRACT

A method for transmitting feedback information by a terminal may comprise: multiplying each of a left side and a right side of a matrix, which is related to a channel measured by the terminal, by a transformation matrix, so as to obtain a first matrix; performing a first transformation which transforms elements other than a predetermined number of elements having a larger size among elements of the first matrix to zero, or performing a second transformation which transforms elements other than elements exceeding a threshold value to zero, so as to obtain a second matrix; quantizing the second matrix so as to obtain a third matrix; configuring a vector by selecting a specific portion in the third matrix according to a predetermined pattern; configuring, into bits, an output obtained by multiplying the configured vector by
(Continued)

a sensing matrix for compression sensing; and transmitting the output bits to a base station.

15 Claims, 6 Drawing Sheets

(51) Int. Cl.
*H04B 7/0456* (2017.01)
*H04B 7/06* (2006.01)

(56) References Cited

U.S. PATENT DOCUMENTS

| | | | | | |
|---|---|---|---|---|---|
| 2014/0328218 | A1* | 11/2014 | Zhu | ..................... | H04L 5/0053 370/259 |
| 2014/0328278 | A1* | 11/2014 | Sexton | ................... | H04L 5/005 370/329 |
| 2015/0256244 | A1* | 9/2015 | Yu | ....................... | H04B 7/0619 375/267 |
| 2019/0044588 | A1* | 2/2019 | Hong | .................... | H04L 5/0048 |
| 2019/0158247 | A1* | 5/2019 | Zhang | .................. | H04B 7/0639 |

FOREIGN PATENT DOCUMENTS

| | | |
|---|---|---|
| KR | 20100038557 | 4/2010 |
| KR | 20110103845 | 9/2011 |

OTHER PUBLICATIONS

PCT International Search Report and Written Opinion in International Application No. PCT/KR2018/005796, dated Sep. 21, 2018, 16 pages (with English translation).

* cited by examiner

METHOD FOR TRANSMITTING FEEDBACK INFORMATION IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/005796, filed on May 21, 2018, which claims the benefit of U.S. Provisional Application No. 62/509,170, filed on May 21, 2017. The disclosures of the prior applications are incorporated by reference in their entirety.

TECHNICAL FIELD

The present invention relates to a wireless communication system, and more particularly, to a method of transmitting feedback information and user equipment therefor.

BACKGROUND ART

As more and more communication devices require greater communication capacity, there is a need for mobile broadband communication enhanced over conventional Radio Access Technology (RAT). In addition, massive Machine Type Communications (MTC) capable of providing a variety of services anywhere and anytime by connecting multiple devices and objects is one of important issues to be considered in the next-generation communications.

Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

DISCLOSURE OF THE INVENTION

Technical Task

One technical task of the present invention is to provide a method for a user equipment to transmit feedback information.

Another technical task of the present invention is to provide a user equipment transmitting feedback information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In one technical aspect of the present invention, provided herein is a method of transmitting feedback information by a user equipment, the method including calculating a first matrix by multiplying left and right sides of a matrix related to a channel measured by the user equipment by transformation matrixes, respectively, calculating a second matrix by performing a first transformation of transforming the rest of elements except a prescribed number of large-sized elements among elements of the first matrix into 0 or a second transformation of transforming the rest of elements except an element exceeding a threshold value among the elements of the first matrix into 0, calculating a third matrix by quantizing the second matrix, configuring a vector by selecting a specific part from the third matrix according to a predetermined pattern, configuring output bits calculated by multiplying the configured vector by a sensing matrix for compressed sensing, and transmitting the output bits to a base station.

The selection of the specific part according to the predetermined pattern may be to select all elements of the third matrix. If the matrix related to the channel of the user equipment is Hermitian matrix, the selection of the specific part according to the predetermined pattern may be to select upper triangular elements only from the third matrix. The calculating the second matrix may include multiplying the first matrix by an identity matrix before performing the first transformation and the second transformation.

The transformation matrix may include Discrete Fourier Transform (DFT) matrix. The matrix related to the channel of the user equipment may include a channel matrix or a channel covariance matrix. The sensing matrix may correspond to a matrix having all matrix elements configured with 1 or −1. Information on the sensing matrix, a function for the quantization, a rule of the first or second transformation or the transformation matrix may be received from the base station through higher layer signaling.

In another technical aspect of the present invention, provided herein is a user equipment transmitting feedback information, the user equipment includes a processor configured to calculate a first matrix by multiplying left and right sides of a matrix related to a channel measured by the user equipment by transformation matrixes, respectively, calculate a second matrix by performing a first transformation of transforming the rest of elements except a prescribed number of large-sized elements among elements of the first matrix into 0 or a second transformation of transforming the rest of elements except an element exceeding a threshold value among the elements of the first matrix into 0, calculate a third matrix by quantizing the second matrix, configure a vector by selecting a specific part from the third matrix according to a predetermined pattern, and configure output bits calculated by multiplying the configured vector by a sensing matrix for compressed sensing and a transmitter transmitting the output bits to a base station.

As the selection of the specific part according to the predetermined pattern, the processor may select all elements of the third matrix. If the matrix related to the channel of the user equipment is Hermitian matrix, the processor may select upper triangular elements only from the third matrix as the selection of the specific part according to the predetermined pattern. The processor may multiply the first matrix by an identity matrix before performing the first transformation and the second transformation. The matrix related to the channel of the user equipment may include a channel matrix or a channel covariance matrix. The sensing matrix may correspond to a matrix having all matrix elements configured with 1 or −1. The user equipment may further include a receiver receiving information on the sensing matrix, a function for the quantization, a rule of the first or second transformation or the transformation matrix from the base station through higher layer signaling.

Advantageous Effect

According to an embodiment of the present invention, by performing feedback with a dominant element only using channel sparsity property instead of feeding back all elements of a matrix X related to a channel of a user equipment, feedback overhead can be reduced considerably.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the disclosure and are incorporated in and constitute a part of this specification, illustrate embodiments of the disclosure.

BEST MODE FOR INVENTION

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

Figure 1:
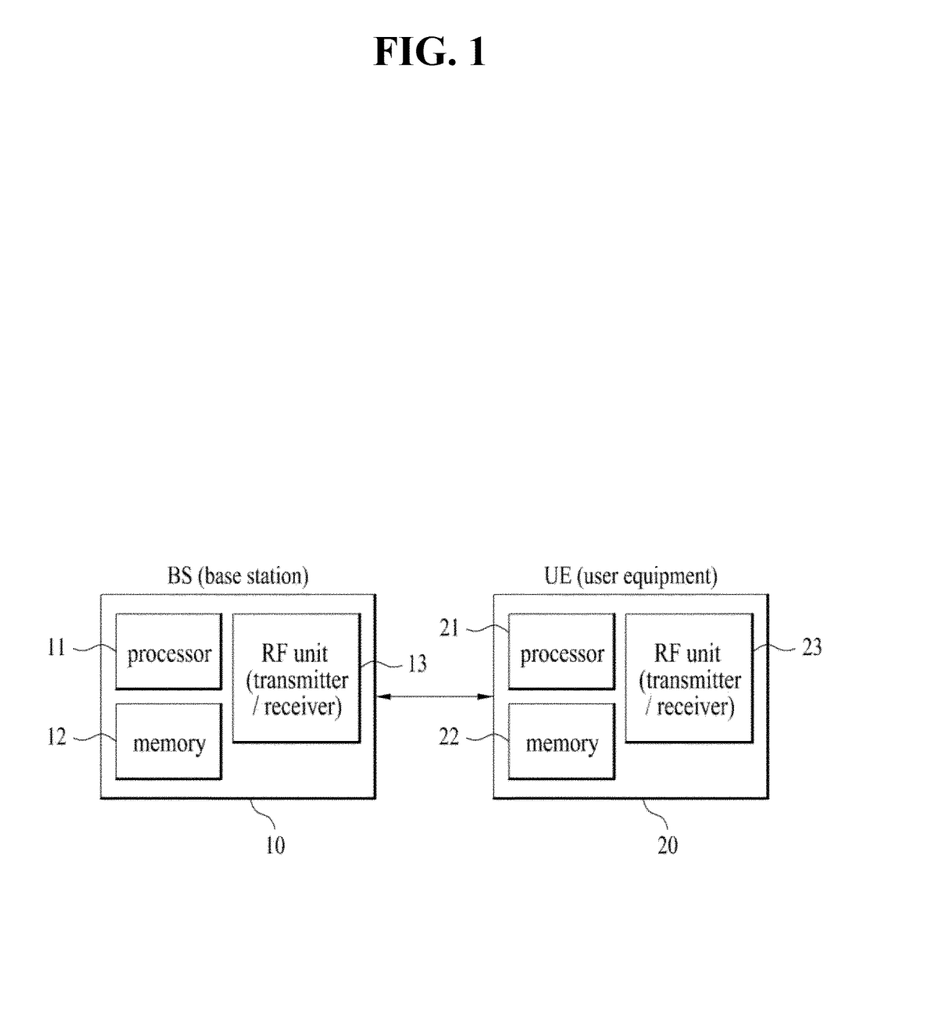
FIG. 1 is a diagram showing an example of a system for implementing the present invention.

FIG. 1 is a diagram showing an example of a system for implementing the present invention.

Referring to FIG. 1, a wireless communication system includes a Base Station (BS) 10 and at least one User Equipment (UE) 20. In Downlink (DL), a transmitter may be a part of the BS 10 and a receiver may be a part of the UE 20. In Uplink (UL), the BS 10 may include a processor 11, a memory 12, a Radio Frequency (RF) unit 13 (transmitter & receiver). The processor 11 may be configured to implement the proposed procedures and/or methods disclosed in the present application. The memory 12 is combined with the processor 11 and stores various kinds of information for operating the processor 11. The RF unit 13 is combined with the processor 11 so as to transmit and/or receive wireless signals. The UE 20 may include a processor 21, a memory 22, an RF unit 23 (transmitter & receiver). The processor 21 may be configured to implement the proposed procedures and/or methods disclosed in the present application. The memory 22 is combined with the processor 21 and stores various kinds of information for operating the processor 21. The RF unit 23 is combined with the processor 21 so as to transmit and/or receive wireless signals. The BS 10 and/or the UE 20 may have a single antenna and a multi-antenna. If at least one of the BS 10 and the UE 20 has the multi-antenna, the wireless communication system may be called Multiple Input Multiple Output (MIMO) system.

Although the processor 21 of the UE and the processor 11 of the BS perform operations of processing signals and data except a function for each of the UE 20 and the BS 10 to receive or transmit signals and data, a storage function and the like, the processors 11 and 21 are not specially mentioned in the present specification for clarity of description. The processor 11/21 can be regarded as performing a series of operations such as data processing and the like instead of a function of receiving or transmitting a signal despite that the processor 11/21 is not mentioned specially.

For the purpose of minimizing latency in the 5$^{th}$ generation New RAT, a TDMed structure of a control channel and a data channel like FIG. 2 in the following can be considered as one type of a frame structure.

The present invention proposes new and various frame structures for the 5$^{th}$ Generation (5G) communication system. In the next generation 5G system, scenarios can be classified into Enhanced Mobile BroadBand (eMBB)/Ultra-reliable Machine-Type Communications (uMTC)/Massive Machine-Type Communications (mMTC), etc. The eMBB is the next generation module communication scenario having such properties as High Spectrum Efficiency, High User Experienced Data Rate, High Peak Data Rate and the like. The uMTC is the next generation mobile communication scenario (e.g., V2X, Emergency Service, Remote Control) having the properties such as Ultra Reliable, Ultra Low Latency, Ultra High Availability and the like. And, the mMTC is the next generation mobile communication scenario (e.g., IoT) having such properties as Low Cost, Low Energy, Short Packet, and Massive Connectivity.

For the purpose of minimizing latency in 5G NR, a TDMed (Time Division Multiplexed) structure of a control channel and a data channel like FIG. 2 in the following can be considered as one type of a frame structure.

Figure 2:
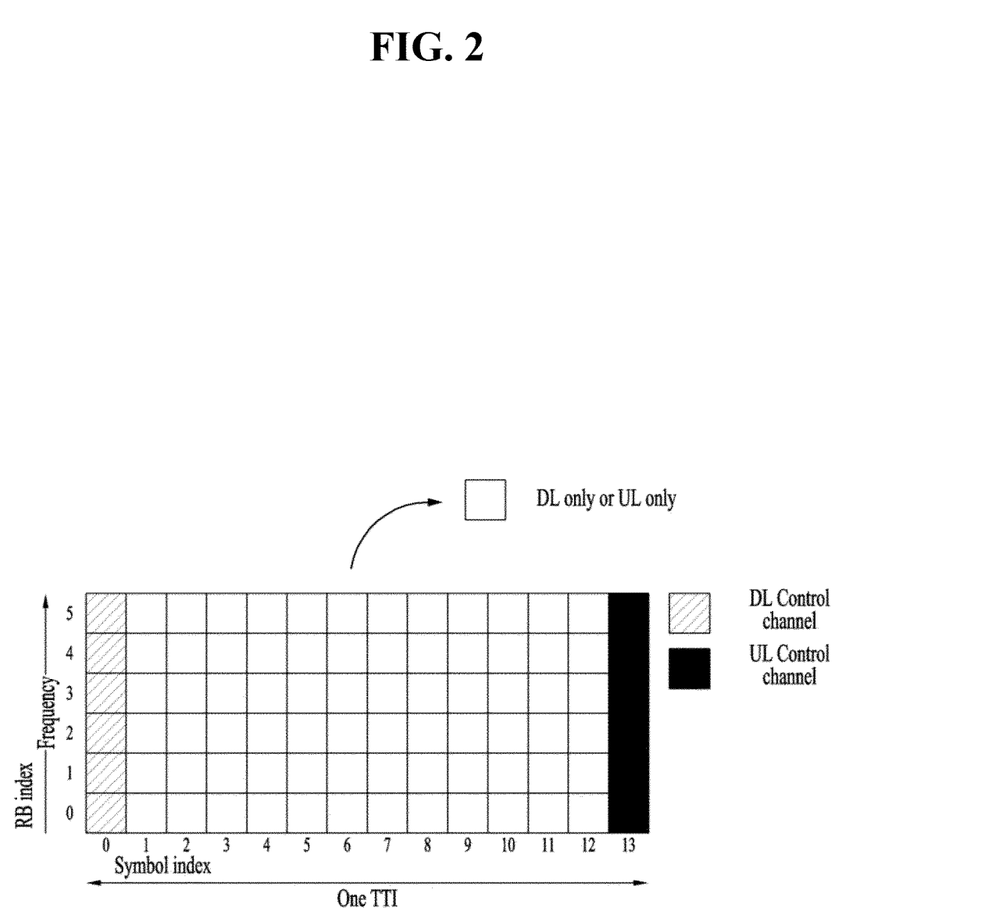
FIG. 2 is a diagram illustrating the structure of a subframe where TDM is applied to data and control channels.

FIG. 2 is a diagram illustrating the structure of a subframe where TDM is applied to data and control channels.

In FIG. 2, the hatched area represents a transmission region for a Physical Downlink Control Channel (PDCCH) carrying Downlink Control Information (DCI), and the last symbol is a transmission region for a Physical Uplink Control Channel (PUCCH) carrying Uplink Control Information (UCI). Here, the DCI corresponding to control information transmitted from an eNB (BS) to a UE may include information on a cell configuration, DL-specific information such as DL scheduling, UL-specific information such as a UL grant, etc., which the UE should know. The UCI corresponding to control information transmitted from a UE to a BS may include an HARQ ACK/NACK report on DL data, a CSI report on a DL channel state, a Scheduling Request (SR), etc.

In FIG. 2, the unhatched area can be configured as a DL or UL interval flexibly for DL/UL flexibility. As one example, the unhatched area can be used for a data channel for transmitting DL data (e.g., Physical Downlink Shared Channel (PDSCH)) or a data channel for transmitting UL data (e.g., Physical Uplink Shared Channel (PUSCH)). According to this structure, an eNB (BS) can transmit DL data and receive an HARQ ACK/NACK signal from a UE in response to the DL data in a single subframe since DL transmission and UL transmission are sequentially performed in the single subframe. Consequently, when a data transmission error occurs, it is possible to reduce a time taken until data retransmission, thereby minimizing the latency of the overall data transmission.

In such a self-contained subframe structure, a time gap is required to allow a BS and a UE to switch from transmission mode to reception mode or vice versa. To this end, some OFDM symbols at the DL-to-UL switching time can be configured as a GP in this self-contained subframe structure.

Analog Beamforming

In the Millimeter Wave (mmW), since a wavelength is short, a plurality of antennas can be installed in the same area. That is, considering that the wavelength in the 30 GHz band is 1 cm, a total of 64 (8×8) antenna elements can be installed in a 4-by-4 cm panel at intervals of 0.5 lambda (wavelength) in the case of a 2-dimensional array. Therefore, in the recent trend of the mmW field, it is attempted to improve the coverage or throughput by increasing the Beam-Forming (BF) gain using multiple antenna elements.

In this case, if each antenna element includes a Transceiver Unit (TXRU) to enable adjustment of transmit power and phase per antenna element, each antenna element can perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beaming is impossible because only one beam direction is generated over the full band.

As an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Hybrid Beamforming

Figure 3:
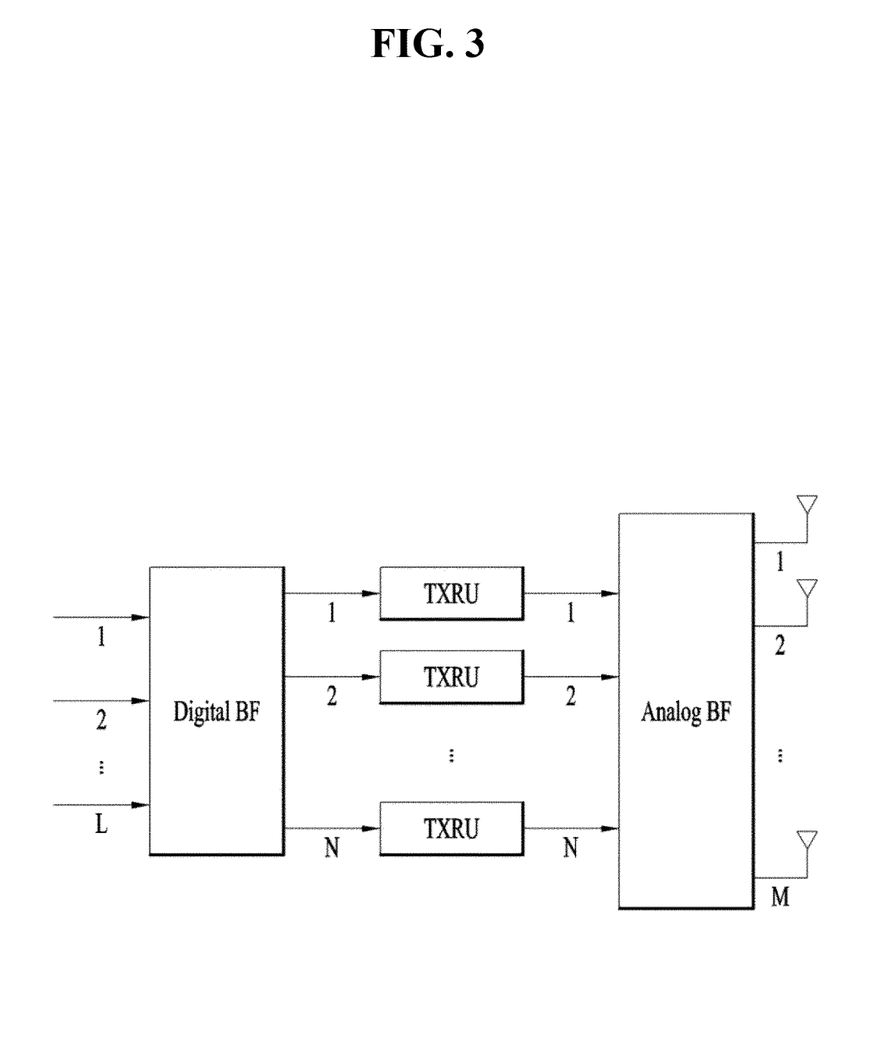
FIG. 3 is a block diagram for hybrid beamforming.

FIG. 3 is a block diagram for hybrid beamforming.

When multiple antennas are used in the NR, a hybrid beamforming technique combining digital beamforming and analog beamforming may be used. In this case, analog beamforming (or RF beamforming) refers to an operation of performing precoding (or combining) in the RF stage. In the hybrid beamforming technique, each of the baseband stage and the RF stage may use precoding (or combining), thereby reducing the number of RF chains and the number of D/A (or a A/D) converters and exhibiting performance close to that of digital beamforming. As shown in FIG. 3, the hybrid beamforming structure may be represented by N transceiver units (TXRU) and M physical antennas for simplicity. Then, the digital beamforming for the L data layers to be transmitted from the transmitting side may be represented by an N by L matrix, and then N converted digital signals are converted into analog signals through the TXRUs and then subjected to analog beamforming represented by an M by N matrix.

FIG. 3 is an schematic diagram of a hybrid beamforming structure in terms of the TXRU and physical antennas. In FIG. 3, the number of digital beams is L, and the number of analog beams is N. Further, in the New RAT system, it is considered to design the base station to change analog beamforming on a symbol-by-symbol basis to support more efficient beamforming for a UE located in a specific area. Further, when N TXRUs and M RF antennas are defined as one antenna panel in FIG. 3, the New RAT system may introduce a plurality of antenna panels to which independent hybrid beamforming is applicable.

When a BS utilizes a plurality of analog beams, an analog beam which is advantageous for signal reception may differ among the UEs, and therefore a beam sweeping operation in which the BS changes a plurality of analog beams to be applied in a specific subframe (SF) on a symbol-by-symbol basis to allow all UEs to have a reception occasion may be considered.

Figure 4:
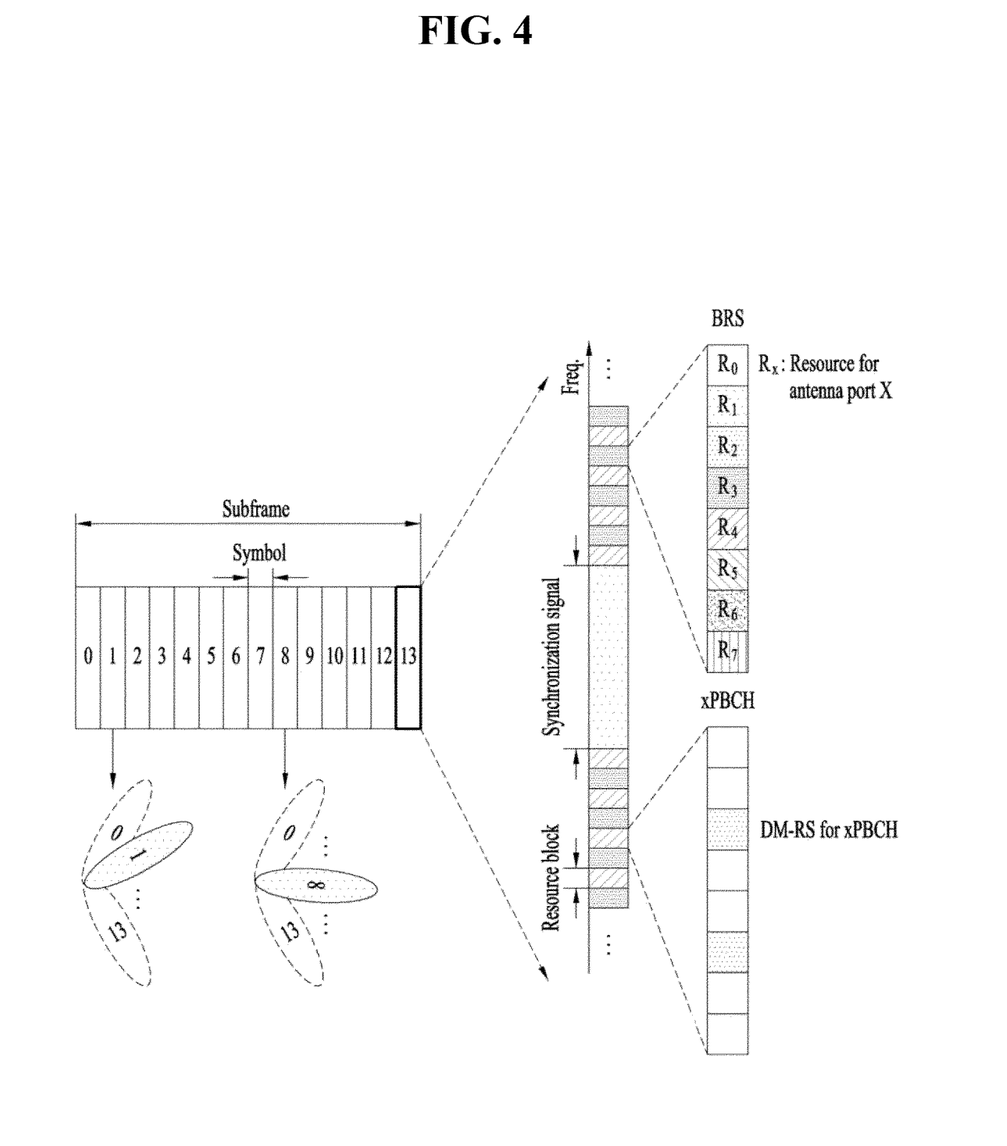
FIG. 4 is a diagram illustrating an example of beams mapped to BRS symbols in hybrid beamforming.

FIG. 4 is a diagram illustrating an example of beams mapped to BRS symbols in hybrid beamforming.

FIG. 4 illustrates the beam sweeping operation for a synchronization signal and system information in a downlink (DL) transmission process. In FIG. 4, a physical resource (or physical channel) on which the system information of the New RAT system is transmitted in a broadcast manner is referred to as a xPBCH (physical broadcast channel). Analog beams belonging to different antenna panels within one symbol may be transmitted simultaneously, and introduction of a beam RS (BRS) may be considered. the BRS is a reference signal (RS) transmitted by applying a single analog beam (corresponding to a specific antenna panel) as shown in FIG. 4 to measure a channel for each analog beam. The BRS may be defined for a plurality of antenna ports, and each antenna port of the BRS may correspond to a single analog beam. While the RS used to measure a beam is referred to as BRS in FIG. 4, it may be called by another name. In this case, unlike the BRS, the synchronization signal or the xPBCH may be transmitted by applying all analog beams in an analog beam group such that any UE can receive the synchronization signal or the xPBCH well.

Compressed Sensing

Compressed sensing scheme used for feedback transmission of the present invention is schematically described as follows.

As a technology candidate for achieving massive connectivity and low complexity in comparison with the massive connectivity, it is able to consider a compressed sensing based transceiving scheme. A compressed sensing technology uses the following principle. Normally, when a linear equation 'Y=AX' is given, if the column number of A is greater than the row number thereof, this problem does not have a single solution. Namely, since the 'A' does not have an inverse matrix in general, when (Y, A) is given, it is given as an under-determined problem to which one or more X's are given as solutions. Here, the matrix A is a non-orthogonal matrix. Yet, if a predetermined assumption is applied to X, as X is given unitarily for such a case, it is able to solve the problem. When the number of non-zero rows of X is equal to or smaller than a predetermined value, this number shall be named sparsity k. In this case, the compressed sensing theory provides the theoretical background that X can be found through (Y, A) no matter how large the column number of A is, if k is smaller than the row number of Y.

In communication situation, when each user has a unique IDentifier (ID), no matter how large the number of IDs is, if a situation is given, it means that a desired user's ID can be found. Hence, in a situation that each user selects a random user ID, compressed sensing is used to detect which user has selected which ID.

CSI Feedback (Reporting) Method

In the existing LTE, a UE performs CSI feedback (e.g., CQI. PMI) by an implicit feedback method. Through such CSI feedback, the UE operates in closed-loop MIMO mode. Yet, in NR, it is considered that the antenna numbers at a base station (gNB) and a UE will increase. In order to further obtain a gain of Multi-User MIMO (MU-MIMO), it is able to consider a method for a UE to transmit explicit feedback (e.g., pure channel or channel variance matrix or eigenvalue/eigenvector) as well as the implicit feedback method. Yet, since the explicit feedback increases feedback overhead, it is preferable that accurate information is delivered while feedback bits are reduced as far as possible. And, such an explicit feedback method is applicable to a case that a UE operates on a band below 6 GHz in NR as well as a band above 6 GHz.

Meanwhile, in a millimeter Wave (mmWave) environment (above 6 GHz), channel sparsity (in angular domain) tends to increase.

Figure 5:
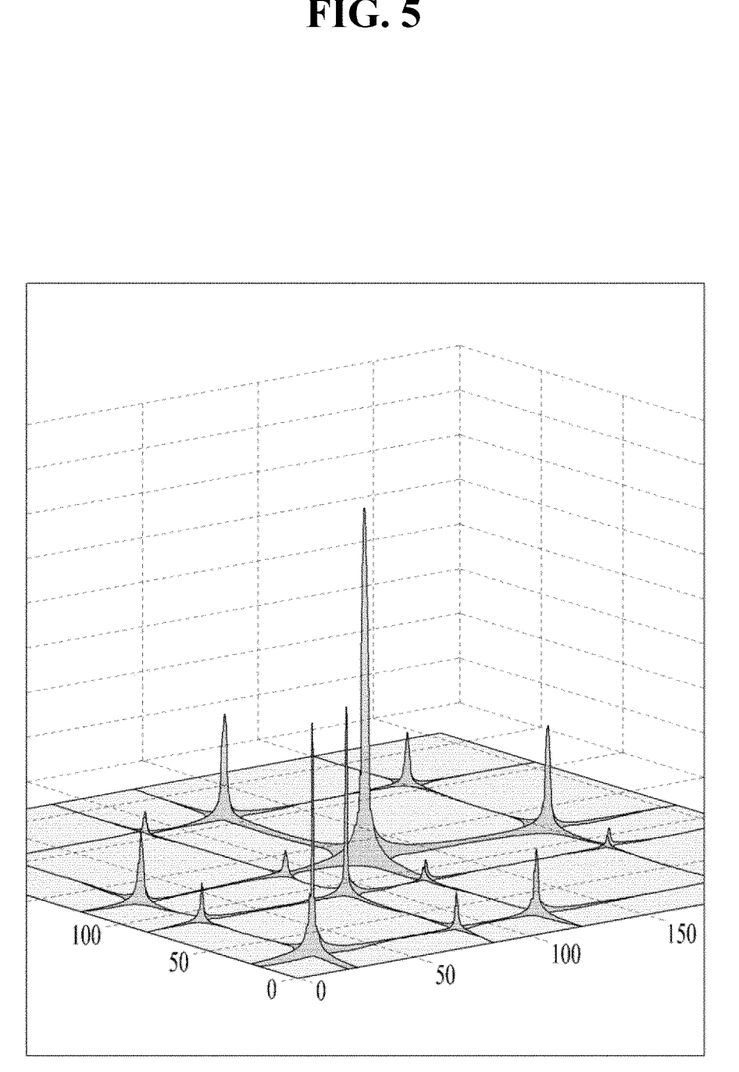
FIG. 5 is a diagram showing an example of sparsity of an angular domain of a Tx channel covariance matrix in case of configuration with 256 antennas as one example in mmWave.

FIG. 5 is a diagram showing an example of sparsity of an angular domain of a Tx channel covariance matrix in case of configuration with 256 antennas as one example in mmWave.

For the efficient mmWave channel estimation, channel sparsity is usable, which is originated from the property of a millimeter channel on which a very few number of valid paths exist. Moreover, although various methods may exist in estimating a millimeter channel, as an mmWave channel has the feature that a very few number of valid paths exist, it is expected that utilization of a compressed sensing scheme of detecting a sparsity signal from the small number of observation values will be effective. The present invention applies a compressed sensing scheme for mmWave channel estimation.

The present invention considers digital feedback for explicit feedback. Namely, it is assumed that it is delivered as payload through a feedback channel (e.g., PUCCH in LTE). And, notations for the symbols to be used for a process for mmWave channel estimation in the present invention are defined as follows.

A: Sensing matrix (e.g., Gaussian random matrix or Bernoulli random matrix)

y: Feedback information vector (UE and gNB)

H: Channel matrix (or vector) measured from DL reference signal by UE

F: Discrete Fourier Transform (DFT) matrix (or steering matrix),

Q(.): Sparsity operation

^H: Hermitian operation

M(.): Quantization operation vec_sel(.): Vectorization of matrix with selection.

A method of reducing digital feedback overhead using channel sparsity is proposed. A specific procedure is described as follows.

Method of Generating Explicit Feedback Information of UE & Reporting

First of all, a UE is assumed as measuring a DL channel using RS (e.g., CSI-RS) transmitted from a Base Station (BS). The UE can perform digital feedback to the BS through the following steps based on a measured DL channel estimation value.

Step 1: A UE represents the measured channel matrix as X. Here, X may be a covariance matrix of a channel or a channel matrix itself. Moreover, for description, a size of a matrix X is assumed as M by K. Although X is described by being assumed as a covariance matrix in the following description, as described above, it can become a channel matrix itself.

Step 2: The UE finds a matrix V1 by multiplying a left and right sides of X by transformation matrixes T1 and T2 (where T1 and T2 may be equal to or different from each other), respectively. Namely, the UE calculates V1=T1·X·T2. In doing so, sizes of the transformation matrixes (e.g., DFT matrixes) by which both sides are multiplied may vary according to a size of X. For example, a matrix of the left side may be an M-by-M transformation matrix T1 (e.g., DFT matrix) and a matrix of the right side may be a K-by-K transformation matrix T2 (e.g., DFT matrix).

Step 3: In order to take sparsity (or channel sparsity) from the matrix V1 (in size of M×K) found in the step 2, the UE performs a sparsity operation (or a channel sparsity operation). Namely, the UE can calculate Q(V1) using a channel sparsity function Q for the matrix V1. This results in V2=Q(V1). Here, the channel sparsity operation may be considered as two kinds of methods.

Method 1: Regarding a channel sparsity operation, the rest of elements except L elements in large size among the respective element size values of the matrix V1 are changed into 0.

Method 2: Regarding a channel sparsity operation, the rest of elements except elements exceeding a specific threshold value among the respective element size values of the matrix V1 are changed into 0.

Step 4: The UE finds V3=M(V2) by performing quantization based on the matrix V2=Q(V1) (where M is a quantization function). Namely, a value of V3 may be an integer or a natural number.

Step 5: The UE can configure vec_sel(V3) from V3, i.e., a vector having elements amounting to R in a determined pattern from elements of the matrix. In this case, R may include all matrix elements of V3 in M×K. or, if X is Hermitian matrix, R may include upper triangular elements only. Moreover, the UE may configure a vector by selecting a predetermined specific part associated with a channel sparsity part.

Moreover, element multiplication may be performed on a masking matrix, i.e., a matrix having desired elements set to 1 and the rest set to 0 before giving the channel sparsity in the step 3. For example, the UE may multiply an identity matrix in form of element multiplication in a manner that the identify matrix is limited to diagonal elements only. If so, the UE can configure a vector amounting to a size of the corresponding diagonal only in the course of the step 5.

Step 6: The UE calculates y by multiplying vec_sel(V3) by a sensing matrix A (y=A×vec_sel(V3)). Thereafter, the UE forward y to the BS through a feedback channel (e.g., a digital feedback channel, etc.). In this case, the reported y may have a size of a vector y. Here, A (in size of P by R) may be Bernoulli random matrix, i.e., a matrix having elements configured with +1 and −1. Moreover, y may be found in form of an integer or a natural number as well. Hence, y can be configured with bits and forwarded to the BS by the UE. Here, P is an observation size (i.e., a size of y) and a total amount of feedback becomes P×(quantization bit per element).

In the above description, M, K, R, A, function Q and the like may be determined or configured by a system environment and include the values known to the UE and the BS in advance.

Reconstruction of Received Explicit Feedback Information of BS

A method for a BS having received explicit feedback to reconstruct X desired to be forwarded by a UE is described as follows.

Step 1: A BS can obtain a y value from feedback (e.g., PUCCH payload) transmitted by a UE. Thereafter, the BS calculates an estimated value of V3 based on the y value and a sensing matrix A and then finds hat_V3 by performing vec_sel^(−1), i.e., a reverse process of vec_sel.

Step 2: The BS finds hat_V2 from hat_V3 through M^(−1) (a reverse process of quantization).

Step 3: The BS can find a final hat_X (i.e., an estimated value of X) by multiplying a left side and a right side of the corresponding matrix by T1^H and T2^H, respectively.

In the above process, the A, the quantization method M, the channel sparsity operation Q and the method of vec_sel( ) may be the methods agreed between the BS and the UE in advance or may be changeable adaptively through signaling. And, the sensing matrix A may identically generate another A for each feedback by sharing a seed number. The corresponding seed number may be forwarded to the UE by the BS through RRC signaling or higher layer signaling. Moreover, for example, a P value may be forwarded through RRC signaling or system information broadcasting.

Embodiment #1

Assume a case that a UE intends to forward a Tx covariance matrix of a channel to a BS. The channel is represented as a matrix H, and assume that a size is (Rx port number of UE, Tx port number of BS), i.e., 4×256. Embodiment of each step is described as follows.

First of all, an execution procedure of a UE is described in the following.

Step 1: X is a Tx covariance matrix and can be obtained through E[H^H×H] and a size becomes 256×256. Namely, this is a case that M=K is 256 all.

Step 2: The UE applies transformation matrixes T1 and T2 as a DFT matrix in size of 256. If a DFT matrix in 256 size is named F, it can be found by performing the following multiplication. V1=F^H×X×F.

Step 3: channel sparsity is generated from an effect that a path is reduced in a radio frequency environment such as mmWave, whereby a dominant path is restrictive. And, assume that restriction is put on a diagonal element only. Hence, all off-diagonal terms are set to 0 in advance. Thereafter, the rest of values except 4 large-size element values (L=4) in a channel sparsity operation, Q(·) are set to 0.

Step 4: Assume that L=4 element values from V2 found from the step 3 are set to linear quantized 6 bits. As a case of a covariance diagonal element is a real value, let's assume that a maximum value of L element values is 64. For example, if 4 values are [63.01, 19.45, 8.34, 3.22], they are quantized into [63, 19, 8, 3] through quantization. Here, in order to make 64 become a maximum size, a maximum size of an element of X can be restricted through CQI and the like.

Step 5: Since the diagonal element is restricted only, vec_sel(V3) from V3 is configured with a vector having total 256 elements. Eventually, it is able to obtain a vector configured as follows. Namely, 4 elements having values of [63, 19, 8, 3] in a 256-length vector are located at element positions of a specific vector, i.e., index and the rest are all 0.

Step 6: Finally, assuming that P is 16, a sensing matrix A is generated in size of 16×256 in a manner that each element is set to +1 or −1, whereby the UE obtains y=A×vec_sel (V3). Thereafter, the respective elements of the corresponding y are configured in a manner of ranging maximum +64 to minimum −64. Hence, the UE can feed back the y value to the BS by making a quantized bit into 7 bits per element. In this case, a total feedback amount becomes 7×16 bits.

The BS having received the feedback performs the following procedure.

Step 1: The BS finds y from the payload and also finds an estimated value of vec_sel(V3) through A used by the UE (the same A is already known to the BS according to previous agreement). Namely, since channel sparsity is sufficient, the BS can obtain values of [63, 19, 8, 3] at 4 indexes from a vector in size of 256. Thereafter, the BS obtains the corresponding vector hat_V3 through a reverse process of vec_sel( ).

Step 2: The BS obtains hat_V2 using hat_V3. Since the value is already quantized from a natural number into a natural number in the corresponding example, there is no additional execution. Yet, for example, in case of using a scheme of quantizing a complex value by PSK method, it is necessary to go through a reverse process.

Step 3: It is able to find an estimated value hat_X of a final X using F×hat_V2×FAH.

Details of the Channel Sparsity Operation (Q(·)) Scheme of the Step 3 of the UE

Method 1: Regarding a sparsity operation, the rest of elements except L large elements among the respective element size values of a matrix V1 are transformed into 0.

Method 2: Regarding a sparsity operation, the rest of elements except elements exceeding a specific threshold value among the respective element size values of a matrix V1 are transformed into 0.

Quantization Operation (M(·)) Scheme of the Step 4 of the UE

Figure 6:
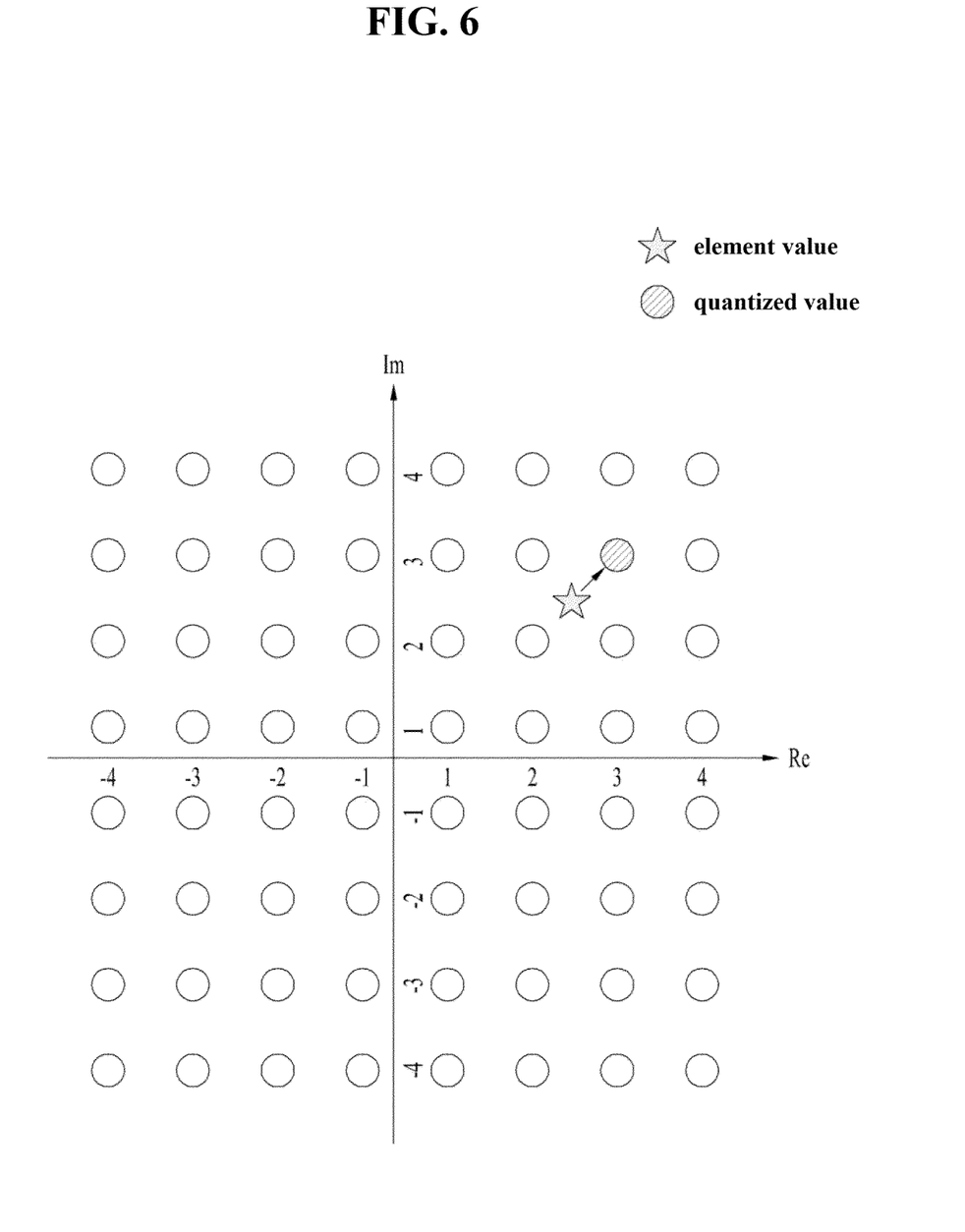
FIG. 6 is a diagram showing an example of a method of quantizing a non-zero value of V2.

FIG. 6 is a diagram showing an example of a method of quantizing a non-zero value of V2.

Method 1: Quantizing Method of a 2D Complex Value

In FIG. 6, if 64 quantizations are performed, it can be represented as 6 bits. Hence, total L non-zero values are mapped to the closest quantized values each, and a corresponding index is obtained as a result value. For example, when an element value is 2.7+2.8, it is quantized into 3+3j. if an index of a corresponding quantized point is assumed as 11, a value of 2.7+2.8j coming after M(·) becomes 11. As the BS has the same mapping rule, if an element value of hat_V3 results in 11, a value can be interpreted as 3+3j. Here, by restricting a maximum size of a non-zero element through CQI and the like, the non-zero element can be quantized according to the mapping rule.

Method 2: Polar Quantization Method of a Complex Value

As a method different from the method 1, a size and angle of a complex value are found and a value can be then found through the respective quantized bits of the size and angle. For example, in case that a size and angle are 3.2 and (1.2)/4*2 pi, respectively, assuming that the size is quantized into 2 bits and the angle is quantized into 4 bits with one of 1, 2, 3 and 4 by 16 steps, a corresponding complex value has a size of 3 and an angle of 4 and a value after M(·) may have a value of (3×16+4=52). ABS interprets 52 in the same manner, thereby interpreting a value having a size of 3 and an angle of ¼*2 pi.

Method 3: When a value of an element has a real value only, a maximum size of the corresponding element can be quantized into a real value only.

Method 4: Case that a Real Value and a Complex Value Coexist

For example, when a diagonal element has a real value only and an off-diagonal value has a complex value, since a transmitting side and a receiving side are already aware of the corresponding structure, if each element is quantized into the same bits, quantization error of the real value can be reduced. On the contrary, a quantization scheme may be applicable in a manner that an off-diagonal term has the same resolution of a diagonal element by doubling increasing a quantization size of the off-diagonal term.

Signaling Scheme Between UE and BS

A BS can inform a UE of P and each element quantization level through RRC signaling, higher layer signaling, System Information Block (SIB) information, or the like. The BS can inform the UE of sparsity L through RRC signaling. Or, according to a scheme, the UE may report L, which is detected after performing Q(·), to the BS. As the L is correctly recognized by a receiving side, reception performance can be improved.

According to the above-described embodiment of the present invention, feedback is performed with a dominant element only using channel sparsity property instead of feeding back all the elements of X, whereby feedback overhead can be reduced considerably.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method of transmitting feedback information in a wireless communication system and apparatus therefor are industrially applicable to 5G communication systems and the like.

What is claimed is:

1. A method of transmitting feedback information by a user equipment, the method comprising:
    calculating a first matrix by multiplying left and right sides of a matrix related to a channel measured by the user equipment by transformation matrixes, respectively;
    calculating a second matrix by performing a first transformation of transforming the rest of elements except a prescribed number of large-sized elements among elements of the first matrix into 0 or a second transformation of transforming the rest of elements except elements exceeding a threshold value among the elements of the first matrix into 0;
    calculating a third matrix by quantizing the second matrix;
    configuring a vector by selecting a specific part from the third matrix according to a predetermined pattern;
    configuring output bits calculated by multiplying the configured vector by a sensing matrix for compressed sensing; and
    transmitting the output bits to a base station.

2. The method of claim 1, wherein the selection of the specific part according to the predetermined pattern is to select all elements of the third matrix.

3. The method of claim 1, wherein if the matrix related to the channel of the user equipment is Hermitian matrix, the selection of the specific part according to the predetermined pattern is to select upper triangular elements only from the third matrix.

4. The method of claim 1, wherein the calculating the second matrix comprises multiplying the first matrix by an identity matrix before performing the first transformation and the second transformation.

5. The method of claim 1, wherein the transformation matrix includes Discrete Fourier Transform (DFT) matrix.

6. The method of claim 1, wherein the matrix related to the channel of the user equipment includes a channel matrix or a channel covariance matrix.

7. The method of claim 1, wherein the sensing matrix corresponds to a matrix having all matrix elements configured with 1 or −1.

8. The method of claim 1, wherein information on the sensing matrix, a function for the quantization, a rule of the first or second transformation or the transformation matrix is received from the base station through higher layer signaling.

9. A user equipment transmitting feedback information, the user equipment comprising:

a processor configured to calculate a first matrix by multiplying left and right sides of a matrix related to a channel measured by the user equipment by transformation matrixes, respectively, calculate a second matrix by performing a first transformation of transforming the rest of elements except a prescribed number of large-sized elements among elements of the first matrix into 0 or a second transformation of transforming the rest of elements except elements exceeding a threshold value among the elements of the first matrix into 0, calculate a third matrix by quantizing the second matrix, configure a vector by selecting a specific part from the third matrix according to a predetermined pattern, and configure output bits calculated by multiplying the configured vector by a sensing matrix for compressed sensing; and a transmitter transmitting the output bits to a base station.

10. The user equipment of claim 9, wherein as the selection of the specific part according to the predetermined pattern, the processor selects all elements of the third matrix.

11. The user equipment of claim 9, wherein if the matrix related to the channel of the user equipment is Hermitian matrix, the processor selects upper triangular elements only from the third matrix as the selection of the specific part according to the predetermined pattern.

12. The user equipment of claim 9, wherein the processor multiplies the first matrix by an identity matrix before performing the first transformation and the second transformation.

13. The user equipment of claim 9, wherein the matrix related to the channel of the user equipment includes a channel matrix or a channel covariance matrix.

14. The user equipment of claim 9, wherein the sensing matrix corresponds to a matrix having all matrix elements configured with 1 or −1.

15. The user equipment of claim 9, further comprising a receiver receiving information on the sensing matrix, a function for the quantization, a rule of the first or second transformation or the transformation matrix from the base station through higher layer signaling.

* * * * *